G. W. COLLIN.
STRAINER.
APPLICATION FILED MAY 14, 1913.
1,199,350.
Patented Sept. 26, 1916.
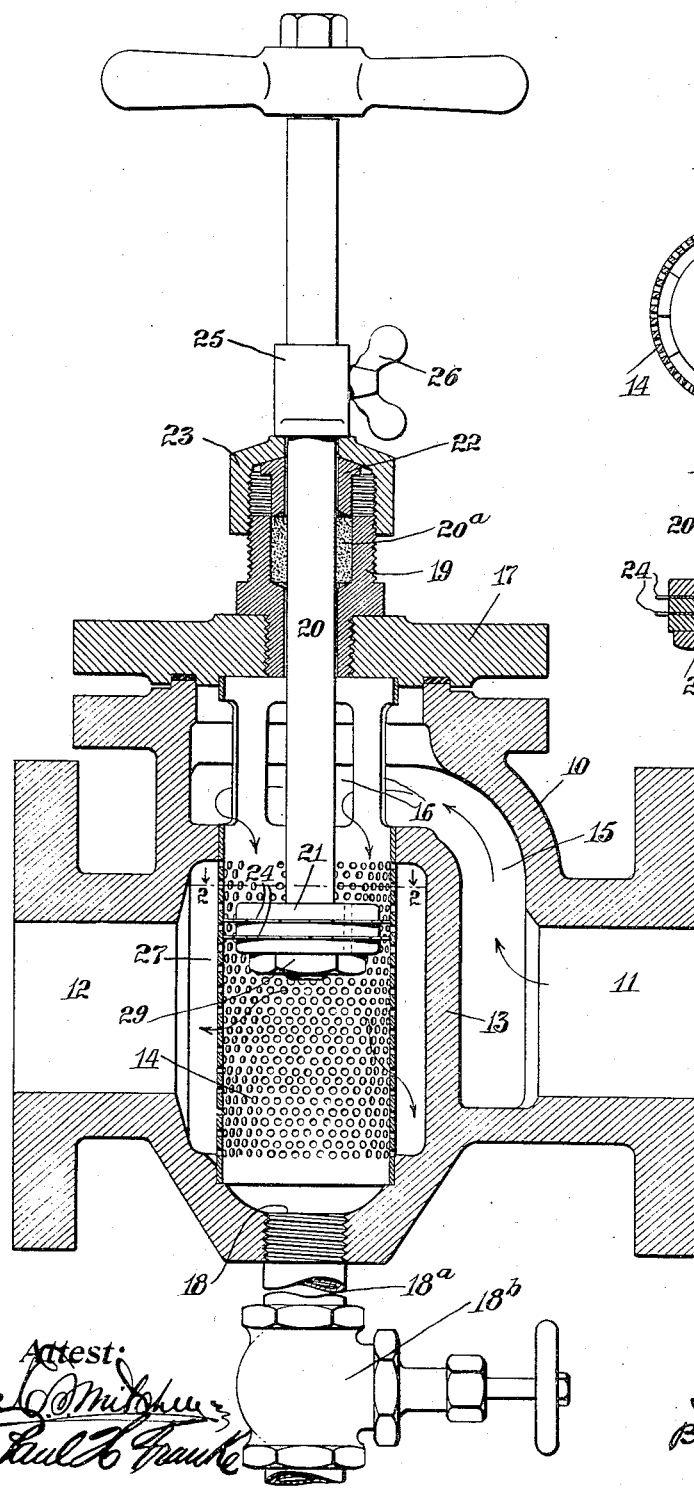
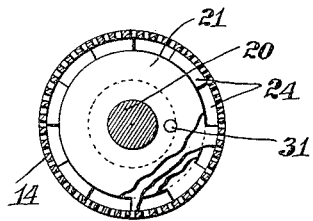
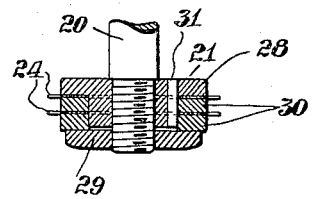
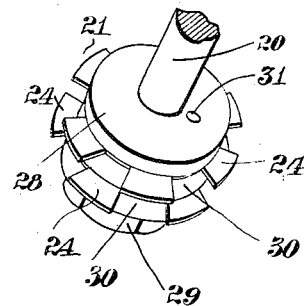
Inventor:
George W. Collin
By Marble & Matty
Attys

UNITED STATES PATENT OFFICE.

GEORGE W. COLLIN, OF BRIDGEPORT, CONNECTICUT, ASSIGNOR TO THE COLLIN VALVE COMPANY, OF BRIDGEPORT, CONNECTICUT, A CORPORATION OF MAINE.

STRAINER.

1,199,350.  Specification of Letters Patent.  Patented Sept. 26, 1916.

Application filed May 14, 1913. Serial No. 767,585.

*To all whom it may concern:*

Be it known that I, GEORGE W. COLLIN, citizen of the United States of America, and a resident of Bridgeport, county of Fairfield, and State of Connecticut, have invented certain new and useful Improvements in Strainers, of which the following is a specification.

My invention relates to improvements in strainers, and embodies improvements upon the strainer illustrated and described in my Patent No. 1,033,544 dated July 23, 1912. The strainer of that patent comprises a screen cylinder set within a chamber of a suitable body, said body having passages leading to and from such chamber and so arranged that the fluid to be strained passes into the interior of the strainer, and thence out through the perforations thereof into the said chamber and then out through the discharge passage of the said body. The invention herein described comprises means for cleaning the surfaces of the strainer, and other features all as hereinafter described and particularly pointed out in the appended claims.

The object of my invention is to facilitate the cleaning of strainer cylinders and the like.

I will now proceed to describe my invention with reference to the accompanying drawings, and will then point out the novel features in claims.

Figure 1 shows a central vertical section of a strainer embodying my invention. Fig. 2 shows a transverse section of the screen cylinder showing a top view of the sweep, a portion of this sweep being broken away. Fig. 3 shows a detail axial section of the sweep. Fig. 4 is a perspective view of the sweep, showing particularly the staggered arrangement of the notches of the sweep disks.

In the drawings, 10 designates the strainer body, 11 the inlet passage thereof and 12 the outlet passage thereof. Within this strainer body there is a bridge 13 ported at the top for the reception of the screen cylinder 14. The body 10 has as a continuation of inlet passage 11, a passage 15 leading to the space above the bridge 13; and the screen cylinder 14 extends through this space above the bridge 13, and is provided with a number of ports 16 for the entry of the fluid to be screened into this screen cylinder. The body 10 is provided with a cover 17, the screen cylinder fitting into a recess in that cover, and also being stepped in a corresponding recess in the bottom of the body 10. In the bottom of the body 10, a cleaning port 18 is provided, to which is connected a blow-off pipe 18$^a$ provided with a suitable valve 18$^b$. This valve is preferably placed several feet from the body 10, the pipe 18$^a$ thereby affording a chamber to receive the heavier foreign matter separated from the fluid by the screen cylinder 14.

Into the central opening of the cover 17 is screwed a stuffing box 19 through which passes the stem 20 of a sweep 21; and this stuffing box is provided with suitable packing material 20$^a$, and with a gland 22 adapted to be pressed against said packing by a screw cap 23. The sweep 21 comprises a plurality of disks 24 of a diameter such that they fit the inner surface of the screen cylinder 14 closely, these disks being notched at the edges, the notches of the different disks being staggered relatively, so that the projections of the one disk are over the notches of the other disk, as indicated particularly in Fig. 4. Since the disks are notched as shown, free flow of liquid past the disks is permitted, even when the sweep is in an intermediate position, as shown in Fig. 1; though in practice, and except when the screen cylinder is being cleaned out by the sweep, said sweep will be drawn up to the extreme top of the screen cylinder, and will be held there by a clamping collar 25 provided with a set screw 26 whereby the collar may be clamped to any portion of the sweep stem 20.

The operation of the strainer is as follows: Normally, the sweep 21 being at the top of the screen cylinder 14, the fluid to be screened enters the admission passage 11 and, passing through passage 15, enters the ports 16 of the screen cylinder, and thence passes down through said screen cylinder and out through the perforations thereof into the chamber 27 and thence into the outlet passage 12. To clean the screen, the set screw 26 of the clamping collar 14 is loosened and said collar is moved to the top of the stem and there fastened, and then the sweep is moved up and down in the screen cylinder, whereby material adhering to the inner surface of the screen cylinder is scraped therefrom and caused to fall into the blow-off pipe 18ª. The stem 20 is then raised to the full height and clamped in that position by means of the clamping collar 25, and at a suitable time the solid matter in pipe 18ª is blown out by opening valve 18ᵇ.

As shown particularly in Fig. 3, the sweep 21 comprises a bushing 28 mounted upon the end of the stem 20, a nut 29, and spacing rings 30 which space the disks 24 apart; these disks being mounted upon the bushing 28. A pin 31 holds the disks 24 in proper relative position, so that the notches of the disks are always staggered. There may be few or many of these sweep disks 24. In the particular construction shown two of these disks are provided, but this number may be greater. I have found phosphor-bronze a very suitable material for these disks.

What I claim is:—

1. A strainer comprising a body having within it a screen chamber and another chamber separated from the screen chamber by a perforate wall, said body having also inlet and outlet connections, one connected to the screen chamber and the other to such other chamber, a screen cylinder extending through said chambers and through the perforation in said wall separating said chambers, the portion of said screen cylinder lying within said screen chamber having screen openings, the portion of said screen cylinder lying within such other chamber having flow ports, a sweep within said screen cylinder and movable longitudinally therein and arranged to be guided thereby, and means for moving said sweep.

2. A strainer comprising in combination a body and a screen cylinder therein, a portion of said cylinder provided with screen holes, said body provided with passages for the flow of liquid into said screen and out through said holes, and a sweep mounted within said screen cylinder and arranged to move longitudinally therein, said body having a space, out of the line of flow, into which the sweep may be withdrawn, and a cylinder within such space and forming an extension of the screen cylinder, said screen cylinder and extension forming a guide for the sweep.

3. A strainer comprising in combination a body and a screen cylinder therein, a portion of said cylinder provided with screen holes, said body provided with passages for the flow of liquid into said screen and out through said holes, and a sweep mounted within said screen cylinder and arranged to move longitudinally therein, said cylinder provided with a portion, beyond the screening portion thereof, into which said sweep may be drawn.

In testimony whereof I have signed this specification in the presence of two subscribing witnesses.

GEORGE W. COLLIN.

Witnesses:
H. M. MARBLE,
PAUL H. FRANKE.